United States Patent
Lubben et al.

(10) Patent No.: US 11,879,528 B2
(45) Date of Patent: Jan. 23, 2024

(54) TRANSMISSION AND AGRICULTURAL OR INDUSTRIAL COMMERCIAL VEHICLE

(71) Applicant: DEERE & COMPANY, Moline, IL (US)

(72) Inventors: Jeffrey L. Lubben, Hudson, IA (US); Pradip Shinde, Chikhali (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/806,761

(22) Filed: Jun. 14, 2022

(65) Prior Publication Data

US 2022/0403925 A1 Dec. 22, 2022

(30) Foreign Application Priority Data

| Jun. 16, 2021 | (DE) | ................. | 102021115606.8 |
| Jun. 16, 2021 | (DE) | ................. | 102021115607.6 |
| Jun. 16, 2021 | (DE) | ................. | 102021115608.4 |
| Jun. 16, 2021 | (DE) | ................. | 102021115609.2 |
| Jun. 16, 2021 | (DE) | ................. | 102021115610.6 |

(51) Int. Cl.
*F16H 37/08* (2006.01)
*B60K 17/08* (2006.01)
(Continued)

(52) U.S. Cl.
CPC .......... *F16H 37/082* (2013.01); *B60K 17/08* (2013.01); *F16H 3/666* (2013.01); *B60K 17/28* (2013.01); *F16H 2200/0004* (2013.01); *F16H 2200/0078* (2013.01); *F16H 2200/0082* (2013.01); *F16H 2200/203* (2013.01); *F16H 2200/2012* (2013.01); *F16H 2200/2015* (2013.01); *F16H 2200/2017* (2013.01); *F16H 2200/2053* (2013.01)

(58) Field of Classification Search
CPC .............................. F16H 3/666; F16H 37/082
See application file for complete search history.

(56) References Cited

U.S. PATENT DOCUMENTS

| 5,106,352 | A | 4/1992 | Lepelletier |
| 7,037,232 | B2 | 5/2006 | Ishimaru |

(Continued)

FOREIGN PATENT DOCUMENTS

| CN | 109578535 A | * | 4/2019 | ............... F16H 3/70 |
| CN | 110345210 A |  | 10/2019 |  |

(Continued)

OTHER PUBLICATIONS

U.S. Appl. No. 17/806,742, filed Jun. 14, 2022.
(Continued)

*Primary Examiner* — Derek D Knight

(57) ABSTRACT

A transmission includes a drive element, a first output element, a primary transmission unit, a reversing unit, and an intermediate gearbox. At least three of the at least eight shifting elements of the primary transmission unit, at least one of the at least two shifting elements of the reversing unit, and at least one of the at least two shifting elements of the intermediate gearbox are activatable in combinations of at least five shifting elements so as to establish at least twenty-eight forward gears between the drive element and the first output element.

14 Claims, 3 Drawing Sheets

(51) Int. Cl.
  *F16H 3/66*     (2006.01)
  *B60K 17/28*    (2006.01)

(56) References Cited

U.S. PATENT DOCUMENTS

| | | | |
|---|---|---|---|
| 7,337,051 | B2 | 2/2008 | Ota et al. |
| 8,251,859 | B2 | 8/2012 | Gumpoltsberger et al. |
| 8,465,390 | B2 | 6/2013 | Brehmer et al. |
| 8,545,362 | B1 | 10/2013 | Goleski et al. |
| 9,267,577 | B2 | 2/2016 | Kaltenbach |
| 9,334,930 | B2 | 5/2016 | Kaltenbach |
| 10,428,911 | B2 | 10/2019 | Ji et al. |
| 10,465,778 | B2 | 11/2019 | Kwon et al. |
| 10,641,372 | B2 * | 5/2020 | Ladriere ............... F16H 37/042 |
| 2016/0061304 | A1 | 3/2016 | Kaltenbach et al. |
| 2019/0085959 | A1 | 3/2019 | Kwon et al. |
| 2021/0341043 | A1 | 11/2021 | Oka |

FOREIGN PATENT DOCUMENTS

| | | | |
|---|---|---|---|
| CN | 105299155 | B | 12/2019 |
| CN | 109578535 | B | 4/2021 |
| DE | 19949507 | A1 | 4/2001 |
| DE | 102008016084 | A1 | 10/2008 |
| DE | 102008041205 | A1 | 2/2010 |
| DE | 102009028710 | A1 | 2/2011 |
| DE | 102011081761 | A1 | 2/2013 |
| DE | 102013209540 | A1 | 11/2013 |
| DE | 102013201182 | A1 | 7/2014 |
| DE | 102013209565 | A1 | 11/2014 |
| DE | 102013110709 | A1 | 4/2015 |
| DE | 102015226265 | A1 | 6/2017 |
| DE | 102015226269 | A1 | 6/2017 |
| EP | 3428480 | A2 | 1/2019 |
| GB | 2440347 | A | 1/2008 |
| WO | WO2018087199 | A1 | 5/2018 |

OTHER PUBLICATIONS

U.S. Appl. No. 17/806,749, filed Jun. 14, 2022.
U.S. Appl. No. 17/806,753, filed Jun. 14, 2022.
U.S. Appl. No. 17/806,756, filed Jun. 14, 2022.
European Search Report issued in application No. 22174969.0, dated Oct. 27, 2022, 9 pages.
European Search Report issued in application No. 22174970.8, dated Oct. 27, 2022, 10 pages.
European Search Report issued in application No. 22174971.6, dated Oct. 27, 2022, 9 pages.
European Search Report issued in application No. 22174972.4, dated Oct. 28, 2022, 9 pages.
European Search Report issued in application No. 22174968.2, dated Oct. 28, 2022, 10 pages.

* cited by examiner

| Gear | C1 | C2 | C3 | C4 | C5 | C6 | C7 Fw | C8 Hi | C9 Low | B1 | B2 | B3 Rev |
|---|---|---|---|---|---|---|---|---|---|---|---|---|
| 1 |  | X |  |  | X |  | X |  | X |  | X |  |
| 2 |  | X |  | X |  |  | X |  | X |  | X |  |
| 3 |  | X |  |  | X |  | X |  | X | X |  |  |
| 4 |  | X |  |  |  | X | X |  | X |  | X |  |
| 5 |  | X |  | X |  |  | X |  | X | X |  |  |
| 6 | X | X |  |  | X |  | X |  | X |  |  |  |
| 7 |  | X |  |  |  | X | X |  | X | X |  |  |
| 8 | X |  | X |  |  | X | X |  | X |  |  |  |
| 9 |  | X | X |  | X |  | X |  | X |  |  |  |
| 10 |  | X |  |  | X |  | X | X |  |  | X |  |
| 11 | X | X |  | X |  |  | X |  | X |  |  |  |
| 12 |  | X | X |  |  | X | X |  | X |  |  |  |
| 13 | X |  | X |  | X |  | X |  | X |  |  |  |
| 14 |  | X |  | X |  |  | X | X |  |  | X |  |
| 15 | X | X |  |  |  | X | X |  | X |  |  |  |
| 16 |  | X |  |  | X |  | X | X |  | X |  |  |
| 17 |  |  | X |  |  | X | X |  |  | X | X |  |
| 18 |  | X |  |  |  | X | X | X |  |  | X |  |
| 19 |  | X |  | X |  |  | X | X |  | X |  |  |
| 20 | X | X |  |  | X |  | X | X |  |  |  |  |
| 21 |  | X |  |  |  | X | X | X |  | X |  |  |
| 22 | X |  | X |  |  | X | X | X |  |  |  |  |
| 23 |  | X | X |  | X |  | X | X |  |  |  |  |
| 24 | X | X |  | X |  |  | X | X |  |  |  |  |
| 25 |  | X | X |  |  | X | X | X |  |  |  |  |
| 26 | X |  | X |  | X |  | X | X |  |  |  |  |
| 27 | X | X |  |  |  | X | X | X |  |  |  |  |
| 28 |  |  | X |  |  | X | X | X |  | X |  |  |

Fig. 3

TRANSMISSION AND AGRICULTURAL OR INDUSTRIAL COMMERCIAL VEHICLE

CROSS-REFERENCE TO RELATED APPLICATIONS

This application claims priority to German Patent Application No. 102021115610.6, filed Jun. 16, 2021, German Patent Application No. 102021115606.8, filed Jun. 16, 2021, German Patent Application No. 102021115607.6, filed Jun. 16, 2021, German Patent Application No. 102021115609.2, filed Jun. 16, 2021, and German Patent Application No. 102021115608.4, filed Jun. 16, 2021, which are all hereby incorporated by reference in their entirety.

FIELD OF THE DISCLOSURE

The present disclosure relates to a transmission and an agricultural or industrial commercial vehicle including a transmission.

BACKGROUND

Different types of transmissions are used in agricultural or industrial commercial vehicles. A usual powertrain architecture provides a traction motor or engine and a transmission. Torque from the traction motor can be transmitted to the ground engagement means by the transmission.

SUMMARY

A multiplicity of different transmissions, for example infinitely variable transmissions (IVT), partial power shift transmissions (PPST) or power shift transmissions (PST) are nowadays used in agricultural or industrial commercial vehicles, for example agricultural or industrial towing vehicles, such as tractors or haulers. The transmissions enable the propulsion of the commercial vehicle to be varied in an uninterrupted manner beyond simply varying the rotating speed of the traction motor, even at a high towing load caused for example by a work machine installed thereon, such as a soil cultivation apparatus (for example a plough) or the like. The transmission of a commercial vehicle here is generally embedded in a higher-level power train architecture of the entire commercial vehicle. A usual power train architecture provides a traction motor or engine and a transmission. These can be disposed along a vehicle longitudinal axis, thus a longitudinal axis of the commercial vehicle that is an axis that runs in a longitudinal direction of the commercial vehicle, or along a forward travel direction of the vehicle, for example in a front half of the commercial vehicle. The commercial vehicle, for example the traction motor, can comprise a crankshaft which may for example be disposed in the proximity of a vehicle central plane or along the latter, for example a vertical vehicle central plane. A force and/or a torque from the traction motor can be transmitted to the ground engagement means, for example wheels and/or chains and/or tracks, of the commercial vehicle by the transmission (propulsion, traction). The transmission, for example a primary transmission unit, can be disposed along the vehicle longitudinal axis and/or along the vehicle central plane and/or, counter to the forward travel direction, behind the traction motor in the direction of the rear end of the vehicle; the primary transmission unit can for example be disposed directly on the traction motor. The drive element, for example the input shaft, of the transmission, for example of the primary transmission unit, can be connected to and/or able to be driven by the crankshaft of the traction motor. The crankshaft axes of the crankshaft of the traction motor, and the drive element of the transmission, can be aligned and/or disposed so as to be mutually coaxial. Alternatively, the crankshaft axis and the drive element can be mutually offset in parallel or disposed at a mutual angle. The first output element of the transmission can be connected or able to be connected directly or indirectly to the ground engagement means in order for the latter to be driven. As a result, a force flux and/or torque flux from the traction motor to the output element and further to a front and/or rear driven axle, and thus to the ground engagement means, can be able to be established by way of the crankshaft and the drive element.

It can be a disadvantage that the transmission requires too much installation space in these commercial vehicles with the known power train architecture. The many shafts and gear wheel sets which are present in known power shift transmissions can be a disadvantage. As a result, the transmission requires installation space which could be utilized for example for additional components and/or a cab of the commercial vehicle. Moreover, the known transmissions can have an insufficient number of gears in the operating range, and/or an insufficient speed range, and/or an insufficient spread between the gears. Especially missing can be a sufficient and optimal number of transmission ratios in the operating range of the speeds in the field. The known transmissions with many shifting elements, for example clutches and/or brakes and/or shifting collars or synchronizers, respectively, can be complex in technical and/or constructive terms and cause high production costs.

The present disclosure is therefore based on the object of proposing a transmission and a commercial vehicle by way of which the aforementioned issues are overcome. A transmission and a commercial vehicle by way of which a diversity of transmissions in a commercial vehicle is increased and/or which are less complex in technical and/or constructive and/or economical terms, and/or wherein the transmission is of a more compact construction mode, and/or the installation space, for example in the commercial vehicle, such as below a cab and/or between the traction motor and the rear axle module can be better utilized, and/or the output and/or the fitness for purpose of the transmission and/or of the commercial vehicle is improved, and/or has a sufficient number of transmission ratios are to be proposed for example.

This object is achieved by a transmission having the features of one or more of the following embodiments, and by an agricultural or industrial commercial vehicle having the features of one or more of the following embodiments. Further embodiments of the disclosure are apparent from the following.

Proposed according to the disclosure is a transmission for transmitting a torque generated by a traction motor to at least one front and/or rear driven axle of an agricultural or industrial commercial vehicle. The transmission comprises a drive element, for example the input shaft, and a first output element, for example a first output shaft, and a primary transmission unit. The primary transmission unit comprises at least one first planetary gear set having a first sun gear, a first ring gear, a first planet carrier, for example a first web, and a first planet set, and a second planetary gear set having a second sun gear, and a third planetary gear set having a third sun gear and a third planet set, and a fourth planetary gear set having a fourth sun gear, a fourth ring gear, a fourth planet carrier and a fourth planet set. The second planetary gear set and the third planetary gear set have a first common planet set and a first common ring gear and a first common planet carrier, for example a first common web. The primary transmission unit moreover comprises at least eight, for example exactly eight, shifting elements. The transmission furthermore comprises an intermediate gearbox which has at least two, for example exactly two, shifting elements. The intermediate gearbox can comprise at least one planetary gear set. At least two forward gears can be able to be established by the intermediate gearbox. The transmission furthermore comprises a reversing unit, wherein the reversing unit comprises at least two, for example exactly two, shifting elements. The reversing unit is for example designed for changing a rotating direction of the transmission, such as for changing a rotating direction of the first output element, and for example of a second output element. Moreover, at least one, for example exactly one, forward gear and one reverse gear can for example be able to be established by the reversing unit. The reversing unit can comprise at least one planetary gear set, or at least two gear sets having in each case one idler gear and one fixed gear. At least three, for example exactly three, of the shifting elements of the primary transmission unit and at least one, for example exactly one, shifting element of the intermediate gearbox and at least one, for example exactly one, shifting element of the reversing unit are activatable, for example selectively activatable, such as lockable and releasable, and/or throwable and/or shiftable and/or selectively engageable, in combinations of at least five, for example exactly five, shifting elements so as to establish at least twenty-eight, for example exactly twenty-eight, forward gears between the drive element and the first output element and/or the second output element. Additionally, at least twenty-eight, for example exactly twenty-eight, reverse gears can moreover be able to be established. In some embodiments, fewer than twenty-eight reverse gears, may also be actually used.

The first common ring gear can be, for example permanently, connected to the reversing unit or to the intermediate gearbox, for example in a rotationally fixed and/or drivable manner. The primary transmission unit can however also comprise a first intermediate element, for example a first layshaft. Specifically, the first intermediate element can be, for example permanently, connected to the first common ring gear and to the reversing unit or to the intermediate gearbox, for example in a rotationally fixed and/or drivable manner.

Likewise, the primary transmission unit can at least partially or else completely comprise the drive element and/or the first output element. At least fourteen forward gears between the drive element and the first common ring gear, for example between the drive element and the first intermediate element, can be able to be established by the primary transmission unit. At least two forward gears can be able to be established by the intermediate gearbox. A total of at least twenty-eight forward gears can thus be able to be established by the primary transmission unit and the intermediate gearbox. One forward gear and one reverse gear can be able to be established by the reversing unit. A total of at least twenty-eight forward gears and twenty-eight reverse gears can thus be able to be established by the primary transmission unit and the intermediate gearbox and the reversing unit.

The planetary gear sets of the primary transmission unit, when viewed axially, can be disposed in the following order: first planetary gear set, fourth planetary gear set, second planetary gear set, and third planetary gear set. The first and the fourth planetary gear set can be configured as simple minus planet sets. As is known, a minus planet set comprises a sun gear, a ring gear, and a planet carrier, planetary gears which mesh in each case with the sun gear and the ring gear being mounted on said planet carrier. As a result, the ring gear has a rotating direction which is counter to that of the sun gear when the planet carrier is held stationary. The first planet set can for example have a set of first planetary gears. The first planet set can comprise three first planetary gears. The first planet set, thus the first planetary gears, can be rotatably mounted on the first planet carrier. The first planet set can mesh with the first sun gear and the first ring gear, thus for example constantly engage so as to mesh with said first sun gear and said first ring gear. The fourth planet set can for example have a set of fourth planetary gears. The fourth planet set can comprise three fourth planetary gears. The fourth planet set, thus the fourth planetary gears, can be rotatably mounted on the fourth planet carrier. The fourth planet set can mesh with the fourth sun gear and the fourth ring gear, thus for example constantly engage so as to mesh with said fourth sun gear and said fourth ring gear. The third planet set can comprise a set of third planetary gears, for example three third planetary gears, and/or the first common planet set can comprise a set of first common planetary gears, for example three first common planetary gears. The third planet set, thus the third planetary gears, and the first common planet set, thus the first common planetary gears, can be rotatably mounted on the first common planet carrier. Moreover, the third planet set can mesh with the third sun gear and the first common planetary gears, thus for example constantly engage so as to mesh with said third sun gear and said first common planetary gears. Moreover, the first common planet set can mesh with the second sun gear and the first common ring gear and the third planet set, thus for example constantly engage so as to mesh with said second sun gear and said first common ring gear and said third planet set. In other words, the second planetary gear set and the third planetary gear set can be configured as a double planetary gear set, for example as a Ravigneaux and/or a Lepelletier planetary gear set. The double planetary gear set here can comprise the second sun gear and the third sun gears, the third planet set and the first common planet set, the first common planet carrier and the first common ring gear. Three planetary gears are in each case usually used for the planet sets of the transmission, thus for example the first planet set and the third planet set, and/or the first common planet set and/or a second common planet set, and/or a fourth planet set and/or a fifth planet set and/or a sixth planet set. However, a different number of planetary gears would also be conceivable, for example in each case four or five or six or a plurality of planetary gears. The number of planetary gears here has an influence on the maximum transmissible torque.

In other words, a multi-stage transmission in a planetary construction mode, comprising the drive element which can be connected to a traction motor, for example in a drivable and/or rotationally fixed manner, is proposed as a transmission. Furthermore, the transmission can comprise at least six, for example exactly six, planetary gear sets, at least two rotatable shafts, the drive element and the first output element as well as at least twelve, for example exactly twelve, shifting elements. The shifting elements of the transmission can be embodied as frictional shifting elements and/or multi-disk shifting elements. The shifting elements can likewise be shifting elements embodied as form-fitting shifting elements. The shifting elements can be brakes and/or clutches. The activation, for example the selective activation or engagement, of the at least five, for example exactly five, shifting elements of the transmission can bring about different transmission ratios between the drive element and the first output element and/or the second output element such that for example at least twenty-eight, for example exactly twenty-eight, forward gears, and for example exactly as many or fewer reverse gears can be established.

The first output element can be provided for driving the rear and/or front ground engagement means of the commercial vehicle, and/or be able to be connected to a rear axle module. As a result, a force flux and/or torque flux between the first output element and the rear and/or front driven axle can be able to be established such that a force and/or a torque can be transmitted to the rear and/or front driven axle of the commercial vehicle, for example. The transmission, for example the primary transmission unit, can however also comprise the second output element, for example a second output shaft. The second output element can be provided for driving the front ground engagement means of the commercial vehicle, and/or be able to be connected, or be connected, in a drivable manner to a front axle module. As a result, a force flux and/or torque flux between the second output element and the front driven axle can be able to be established such that a force and/or a torque can be transmitted to the front driven axle of the commercial vehicle, for example, and a force flux and/or torque flux between the first drive element and the rear driven axle can for example be able to be simultaneously established. The first output element and the second output element can thus be connected, or able to be connected, in a drivable manner. A force flux and/or torque flux, for example a separate force flux and/or torque flux, from the first output element to the rear driven axle, and from the second output element to the front driven axle, can thus be able to be established.

The transmission can have a rear axle module. The rear axle module can at least partially or completely comprise the rear driven axle and/or a rear axle differential. The rear axle module, for example the rear axle differential, can comprise a rear axle pinion, for example a drive bevel gear, or a bevel pinion, and a rear axle gear wheel, for example a bevel gear wheel or a ring gear wheel. The rear axle housing can receive the rear axle module, for example the rear axle differential, and/or at least partially receive the rear driven axle. The first output element can be connected to the rear axle pinion, or the rear axle pinion and the first output element can be configured as an integral component. The transmission can have a front axle module. The front axle module can partially or completely comprise the front driven axle and/or a front axle differential. The front axle module, for example the front axle differential, can comprise a front axle pinion, for example a drive bevel gear, or a bevel pinion, and a front axle gear wheel, for example a bevel gear wheel or a ring gear wheel. A front axle housing can receive the front axle module, for example the front axle differential, and/or at least partially receive the front driven axle. The second output element can be connected to the front axle pinion, or the front axle pinion and the second output element can be configured as an integral component.

The transmission can comprise a primary transmission housing which receives the primary transmission unit, and/or a reversing unit housing which receives the reversing unit, and/or an intermediate gearbox housing which receives the intermediate gearbox, and/or a rear axle housing which receives the rear axle module, and/or a front axle housing which receives the front axle module. The primary transmission housing and/or the reversing unit housing and/or the intermediate gearbox housing and/or the rear axle housing and/or the front axle housing, independently of the number of planetary gear sets and/or shafts, can have a predefinable and/or fixed installation space, thus a predefinable axial and lateral extent. As a result, the housings, for example in a state installed in the commercial vehicle, always have the same installation space and/or thus a modularity in terms of the installation space in the commercial vehicle. The primary transmission housing and/or the reversing unit housing and/or the intermediate gearbox housing and/or the rear axle housing and/or the front axle housing can be configured so as to be integral or in multiple parts. The primary transmission housing and/or the reversing unit housing and/or the intermediate gearbox housing and/or the rear axle housing and/or the front axle housing can therein receive components of the transmission.

The transmission can moreover comprise a coupling element. The coupling element can be disposed on the drive element. The traction motor, for example the crankshaft or a drive shaft of the traction motor, and the coupling element or the drive element, in a state installed in the commercial vehicle, can be able to be connected, or be connected, in a rotationally fixed and/or drivable manner, for example by way of a shaft-to-hub connection. As a result, a torque flux can be able to be established between the primary transmission unit and/or the reversing unit and/or the intermediate gearbox and/or the rear axle module and/or the front axle module; for example, the drive element and thus the first output element and/or the second output element can be drivable by the traction motor.

In a state in which the transmission is installed in a commercial vehicle, a transmission longitudinal axis, thus a longitudinal axis of the transmission that is an axis that runs in a longitudinal direction of the transmission, can be disposed so as to be parallel to or coaxial with the vehicle longitudinal axis. The planetary gear sets can be disposed axially or along the transmission longitudinal axis.

It is relevant to the disclosure that the transmission has sufficient transmission ratios, and/or the complexity in terms of construction and the installation size, for example the installation space, or the weight, respectively, are optimized and the degree of efficiency improved in terms of losses related to toothing and drag. Minor torques are present in the shifting elements and in the planetary gear sets of the transmission, the wear on the transmission being reduced as a result. As a result of the embodiment of the transmission and/or as a result of the minor torques, an embodiment which is simple in terms of construction, for example a compact construction mode, thus a small volume of the transmission and/or small dimensions are/is likewise achieved such that the installation space required by the transmission and the corresponding costs are reduced. Moreover, minor rotating speeds are also present at the shafts, the shifting elements and the planetary gear sets. The transmission is moreover conceived in such a manner that an adaptability to different power train architectures in the direction of the force flux and/or torque flux, as well as in terms of space, is made possible. The transmission can be installed in the commercial vehicle in a front-transverse construction mode, or in the context of a standard drive, for example. In a state of the transmission installed in the commercial vehicle, the installation space, for example the axial and radial space, of the transmission in the commercial vehicle can be minimized by virtue of the spatial disposal of the three planet sets. Moreover, the transmission has a minor or minimal number of gear wheels and shifting elements, as a result of which the transmission, for example also in a state installed in the commercial vehicle, has a more compact construction mode which is simpler in terms of construction, the complexity in terms of construction being significantly reduced. A positive degree of efficiency in terms of the losses related to toothing and drag is derived in the forward and/or reverse gears in the transmission. The transmission and the commercial vehicle overall are thus less complex in technical and constructive and economical terms. An additional installation space for components outside the transmission is likewise made possible. Moreover, the cab can be disposed deeper down, thus so as to be displaced in the direction of a support surface of the commercial vehicle, than cabs in known commercial vehicles. As a result of the embodiment of the transmission according to the disclosure, transmission ratios which are suitable for commercial vehicles and an increased overall spread of the multi-stage transmission are obtained, bringing about as a result an improvement in the driving comfort and a significant reduction in fuel consumption. The output and/or the roadworthiness and/or road holding of the commercial vehicle can thus be improved as a result.

In an embodiment of the disclosure, the reversing unit and/or the intermediate gearbox in the direction of the force flux and torque flux are/is disposed downstream of the primary transmission unit. The intermediate gearbox in the direction of the force flux and torque flux can be disposed downstream of the primary transmission unit and upstream of the reversing unit, or the reversing unit in the direction of the force flux and torque flux can be disposed downstream of the primary transmission unit and upstream of the intermediate gearbox. The primary transmission unit and/or the intermediate gearbox and/or the reversing unit can be disposed along the transmission longitudinal axis and/or the vehicle longitudinal axis. Likewise, the intermediate gearbox and/or the reversing unit can also be disposed upstream of the primary transmission unit. As a result, a compact axial construction mode is achieved.

In an embodiment of the disclosure, the shifting elements of the primary transmission unit are a first brake and a second brake and a first clutch and a second clutch and a third clutch and a fourth clutch and a fifth clutch and a sixth clutch. The drive element can be connected, or able to be connected, to the fourth clutch and the fifth clutch and the sixth clutch, for example be connected or able to be connected in a rotationally fixed and/or drivable manner. The transmission, for example the primary transmission unit, can comprise a first connecting element, for example a first connecting shaft. The first connecting element can be connected, or able to be connected, to the drive element and the fourth clutch and the fifth clutch and the sixth clutch, for example be connected or able to be connected in a rotationally fixed and/or drivable manner. The fifth clutch can be connected, or able to be connected, to the fourth ring gear, for example be connected or able to be connected in a rotationally fixed and/or drivable manner. The transmission, for example the primary transmission unit, can comprise a second connecting element, for example a second connecting shaft. The second connecting element can be connected, or able to be connected, to the fifth clutch and the fourth ring gear, for example be connected or able to be connected in a rotationally fixed and/or drivable manner. The drive element, and for example the first connecting element, can be releasably connected, or able to be connected, by the fifth clutch, or by way of the fifth clutch, to the fourth ring gear and/or for example the second connecting element, for example connected or able to be connected in a releasable, rotationally fixed and/or drivable manner. The fifth clutch can thus be configured for coupling the drive element, and for example the first connecting element, to the fourth ring gear and/or for example the second connecting element. The sixth clutch can be connected, or able to be connected, to the first planet carrier, for example be connected or able to be connected in a rotationally fixed and/or drivable manner. The transmission, for example the primary transmission unit, can comprise a third connecting element, for example a third connecting shaft. The third connecting element can be connected, or able to be connected, to the sixth clutch and the first planet carrier, for example be connected or able to be connected in a rotationally fixed and/or drivable manner. The drive element, and for example the first connecting element, can be releasably connected, or able to be connected, by the sixth clutch, or by way of the sixth clutch, to the first planet carrier and/or for example the third connecting element, for example connected or able to be connected in a releasable, rotationally fixed and/or drivable manner. The sixth clutch can thus be configured for coupling the drive element, and for example the first connecting element, to the first planet carrier and/or for example the third connecting element. The first ring gear can be connected to the fourth planet carrier, for example be connected in a rotationally fixed and/or drivable manner. The transmission, for example the primary transmission unit, can comprise a fourth connecting element, for example a fourth connecting shaft. The fourth connecting element can be connected to the first ring gear and the fourth planet carrier, for example be connected in a rotationally fixed and/or drivable manner. The fourth planet carrier can be connected, or able to be connected, to the first clutch and/or the second clutch and/or the fourth clutch, for example be connected or able to be connected in a rotationally fixed and/or drivable manner. Likewise, the transmission, for example the primary transmission unit, can comprise a fifth connecting element, for example a fifth connecting shaft. The fifth connecting element can be connected, or able to be connected, to the fourth planet carrier and/or the first clutch and/or the second clutch and/or the fourth clutch, for example be connected or able to be connected in a rotationally fixed and/or drivable manner. The fourth planet carrier, and for example the fifth connecting element, can be releasably connected, or able to be connected, by the fourth clutch, or by way of the fourth clutch, to the drive element and for example the first connecting element, for example connected or able to be connected in a releasable, rotationally fixed and/or drivable manner. The fourth clutch can thus be configured for coupling the fourth planet carrier, and for example the fifth connecting element, to the drive element and for example the first connecting element. Moreover, the second sun gear can be connected, or able to be connected, to the first brake and/or the first clutch, for example connected or able to be connected in a rotationally fixed and/or drivable manner. The transmission, for example the primary transmission unit, can comprise a sixth connecting element, for example a sixth connecting shaft. The sixth connecting element can be connected, or able to be connected, to the second sun gear and/or the first brake and/or the first clutch, for example be connected or able to be connected in a rotationally fixed and/or drivable manner. The fourth planet carrier, and for example the fifth connecting element, and/or the first clutch and/or the second clutch and/or the fourth clutch, can be releasably connected, or able to be connected, by the first clutch, or by way of the first clutch, to the second sun gear and/or the first brake and/or for example the sixth connecting element, for example connected or able to be connected in a releasable, rotationally fixed and/or drivable manner. The first clutch can thus be configured for coupling the first clutch and/or the second clutch and/or the fourth clutch, and for example the fifth connecting element, to the second sun gear and/or the first brake and/or for example the sixth connecting element. The second sun gear, and for example the sixth connecting element, by way of the first brake can be able to be held against rotating, for example be able to be releasably held against rotating. The second sun gear, and for example the sixth connecting element, by way of the first brake can be able to be coupled to a primary transmission housing and/or able to be releasably connected to the primary transmission housing, for example be able to be releasably held against rotating. The first brake can thus be configured for holding the second sun gear, and for example the sixth connecting element, against rotating. Likewise, the third sun gear can be connected, or able to be connected, to the second clutch, for example be connected or able to be connected in a rotationally fixed and/or drivable manner. The transmission, for example the primary transmission unit, can comprise a seventh connecting element, for example a seventh connecting shaft. The seventh connecting element can be connected, or able to be connected, to the third sun gear and/or the second clutch, for example be connected or able to be connected in a rotationally fixed and/or drivable manner. The first clutch and/or the second clutch and/or the fourth clutch, and for example the fifth connecting element, can be releasably connected, or able to be connected, by the second clutch, or by way of the second clutch, to the third sun gear and/or for example the seventh connecting element, for example connected or able to be connected in a releasable, rotationally fixed and/or drivable manner. The second clutch can thus be configured for coupling the first clutch and/or the second clutch and/or the fourth clutch, and for example the fifth connecting element, to the third sun gear and/or for example the seventh connecting element. Likewise, the first common planet carrier can be connected, or able to be connected, to the second brake, for example be connected or able to be connected in a rotationally fixed and/or drivable manner. The transmission, for example the primary transmission unit, can comprise an eighth connecting element, for example an eighth connecting shaft. The eighth connecting element can be connected, or able to be connected, to the second brake and/or the first common planet carrier, for example be connected or able to be connected in a rotationally fixed and/or drivable manner. Specifically, the first intermediate element can be connected to the first common ring gear, for example be connected in a rotationally fixed and/or drivable manner. The first common planet carrier and/or the first common planet set, and for example the eighth connecting element, by way of the second brake can be able to be held against rotating, for example be able to be releasably held against rotating. The first common planet carrier and/or the first common planet set and/or the third planet set, and for example the eighth connecting element, by way of the second brake can be able to be coupled to the primary transmission housing and/or able to be releasably connected to the primary transmission housing, for example be able to be releasably held against rotating. The second brake can thus be configured for holding the first common planet carrier and/or the first common planet set and/or the third planet set, and for example the eighth connecting element, against rotating. The drive element can be connected to the third clutch, for example be connected in a rotationally fixed and/or drivable manner. The transmission, for example the primary transmission unit, can comprise a ninth connecting element, for example a ninth connecting shaft. The ninth connecting element can be connected to the drive element and the third clutch, for example be connected in a rotationally fixed and/or drivable manner. The third clutch can be able to be connected to the first common planet carrier, for example be able to be connected in a rotationally fixed and/or drivable manner. The transmission, for example the primary transmission unit, can comprise a tenth connecting element, for example a tenth connecting shaft. The tenth connecting element can be connected, or able to be connected, to the first common planet carrier and the third clutch, for example be connected or able to be connected in a rotationally fixed and/or drivable manner. The drive element, and for example the ninth connecting element, can be releasably connected, or able to be connected, by the third clutch, or by way of the third clutch, to the first common planet carrier and/or for example the tenth connecting element, for example connected or able to be connected in a releasable, rotationally fixed and/or drivable manner. The third clutch can thus be configured for coupling the drive element, and for example the ninth connecting element, to the first common planet carrier, and/or for example the tenth connecting element. The first sun gear and the fourth sun gear can be held against rotating. The first sun gear and the fourth sun gear can be coupled to the primary transmission housing and/or be able to be connected to the primary transmission housing, for example be held against rotating.

In an embodiment of the disclosure, the reversing unit comprises a fifth planetary gear set having a fifth sun gear, a fifth ring gear, a fifth planet carrier and a fifth planet set. The shifting elements of the reversing unit are a seventh clutch and a third brake. The reversing unit can be disposed so as to be parallel to or coaxial with the drive element and/or the first output element. The fifth planet set can have a set of fifth planetary gears, for example three fifth planetary gears. The fifth planetary gears can be rotatably mounted on the fifth planet carrier. The fifth planet set, thus for example the set of fifth planetary gears, can mesh with the fifth sun gear and the fifth ring gear, thus for example constantly engage so as to mesh with said fifth sun gear and said fifth ring gear. The reversing unit can comprise at least two, for example exactly two, shifting elements which are activatable, for example selectively activatable, such as lockable and releasable, and/or throwable and/or shiftable and/or selectively engageable, so as to connect the first common ring gear, and for example the first intermediate element, to the fifth sun gear, or so as to hold the fifth ring gear against rotating. The first common ring gear, and for example the first intermediate element, can be connected, or able to be connected, to the fifth planet carrier and/or the seventh clutch, for example be connected or able to be connected in a rotationally fixed and/or drivable manner. The fifth sun gear can be connected, or able to be connected, to a sixth sun gear and/or the seventh clutch and/or an eighth clutch, for example be connected or able to be connected in a rotationally fixed and/or drivable manner. The transmission, for example the reversing unit, can comprise an eleventh connecting element, for example an eleventh connecting shaft. The eleventh connecting element can be connected, or able to be connected, to the fifth sun gear and a sixth sun gear and/or the seventh clutch and/or an eighth clutch, for example be connected or able to be connected in a rotationally fixed and/or drivable manner. The fifth planet carrier and the first common ring gear, and for example the first intermediate element, can be able to be releasably connected by the seventh clutch, or by way of the seventh clutch, to the fifth sun gear and/or for example the eleventh connecting element and/or the sixth sun gear, for example be able to be connected in a releasable, rotationally fixed and/or drivable manner. The eighth clutch can thus be configured for coupling the fifth planet carrier and the first common ring gear, and for example the first intermediate element, to the fifth sun gear and/or for example the eleventh connecting element and/or the sixth sun gear. The fifth ring gear by way of the third brake can be able to be held against rotating, for example be able to be releasably held against rotating. The fifth ring gear by way of the third brake can be able to be coupled to a housing of the reversing unit, thus a reversing unit housing, and/or be able to be releasably connected thereto, for example be able to be releasably held against rotating. The third brake can thus be configured for holding the fifth ring gear against rotating. The above-mentioned advantages according to the disclosure are achieved by virtue of the combination of the primary transmission unit and the reversing unit. Moreover, the reversing unit by virtue of the described planetary construction mode has a minor axial construction length. This has an overall advantageous effect for example on the axial construction length of the transmission and/or the installation space of the transmission, for example in a state in which the transmission is installed in the commercial vehicle.

In an embodiment, the transmission comprises an intermediate gearbox. The intermediate gearbox has a sixth planetary gear set having a sixth sun gear, a sixth ring gear, a sixth planet carrier, for example a sixth web, and a sixth planet set. The intermediate gearbox can comprise at least two, for example exactly two, shifting elements. The shifting elements of the intermediate gearbox are an eighth clutch and a ninth clutch. The transmission, for example the intermediate gearbox, can partially or else completely comprise a second intermediate element. The sixth planet set can have a set of sixth planetary gears, for example three sixth planetary gears. The sixth planetary gears can be rotatably mounted on the sixth planet carrier. The sixth planet set, thus for example the set of sixth planetary gears, can mesh with the sixth sun gear and the sixth ring gear, thus for example constantly engage so as to mesh with said sixth sun gear and said sixth ring gear. Moreover, the intermediate gearbox can be disposed so as to be parallel to or coaxial with the drive element and/or the first output element. Specifically, the intermediate gearbox can at least partially or complete comprise the first output element. The two shifting elements of the intermediate gearbox are activatable, for example selectively activatable, such as lockable and releasable and/or throwable and/or shiftable and/or selectively engageable so as to connect and/or couple, for example releasably connect in a rotationally fixed and/or drivable manner, the sixth sun gear or the sixth planet set and/or the sixth planet carrier to the second intermediate element and/or for example the first output element. The sixth sun gear can be connected, or able to be connected, to the fifth sun gear and/or the seventh clutch and the eighth clutch, for example be connected or able to be connected in a rotationally fixed and/or drivable manner. The eleventh connecting element can be connected, or able to be connected, to the fourth sun gear and the fifth sun gear and/or the seventh clutch and/or the eighth clutch, for example be connected or able to be connected in a rotationally fixed and/or drivable manner. Specifically, the reversing unit and/or the intermediate gearbox can comprise the eleventh connecting element. The fifth sun gear and the sixth sun gear, and for example the eleventh connecting element, can be able to be releasably connected by the eighth clutch, or by way of the eighth clutch, to the second intermediate element and/or for example the first output element, for example be able to be connected in a releasable, rotationally fixed and/or drivable manner. The eighth clutch can thus be configured for coupling the fifth sun gear and the sixth sun gear, and for example the eleventh connecting element, to the second intermediate element and/or for example the first output element. Moreover, the sixth planet carrier can be connected, or able to be connected, to the ninth clutch, for example be connected or able to be connected in a rotationally fixed and/or drivable manner. The transmission, for example the intermediate gearbox, can comprise a twelfth connecting element, for example a twelfth connecting shaft. The twelfth connecting element can be connected, or able to be connected, to the ninth clutch and/or the sixth planet carrier, for example be connected or able to be connected in a rotationally fixed manner. The sixth planet carrier and/or the sixth planet set, and for example the twelfth connecting element, can be able to be releasably connected by the ninth clutch, or by way of the ninth clutch, to the second intermediate element and/or for example the first output element, for example be able to be connected in a releasable, rotationally fixed and/or drivable manner. The ninth clutch can thus be configured for coupling the sixth planet carrier, and for example the twelfth connecting element, to the second intermediate element and/or for example the first output element. The sixth ring gear can be held against rotating. The sixth ring gear can be coupled to a housing of the intermediate gearbox, thus an intermediate gearbox housing, and/or be connected to the latter, for example held against rotating. The above-mentioned advantages according to the disclosure are achieved by virtue of the combination of the primary transmission unit and the intermediate gearbox. Moreover, the intermediate gearbox by virtue of the described planetary construction mode has a minor axial construction length. This has an overall advantageous effect for example on the axial construction length of the transmission and/or the installation space of the transmission, for example in a state in which the transmission is installed in the commercial vehicle.

In an embodiment of the transmission, the transmission comprises a power take-off module. The rear axle module, for example the rear axle housing, can be disposed between the power take-off module and the primary transmission unit. The transmission can comprise a power take-off drive shaft. The power take-off module can be able to be driven by the power take-off drive shaft. The transmission longitudinal axis here can be coaxial with or parallel to the power take-off drive shaft. The power take-off drive shaft can for example be disposed in the drive element. A power take-off housing can receive the components of the power take-off module. The components of the power take-off module can be the power take-off drive shaft and/or the power take-off stub as well as the power take-off gearbox. The power take-off drive shaft can be embodied as a solid shaft. The drive element can be embodied as a hollow shaft. The drive element can receive the power take-off drive shaft within said drive element. The power take-off drive shaft, in a state in which the transmission is installed in the commercial vehicle, can be able to be driven by the traction motor, for example also be coupled in such a manner that the power take-off drive shaft is drivable by the traction motor. The power take-off module, for example the power take-off gearbox, by way of the power take-off drive shaft, for example also by way of the rear axle module, for driving can thus be operatively connected to the traction motor by way of the drive element or be drivable by said traction motor by way of the drive element. In this way, a direct and thus particularly energy-efficient transmission of a drive output from the traction motor to a power take-off module, for example the power take-off output of the commercial vehicle, is possible.

In an embodiment, the first output element in a drivable manner is connected, or able to be connected, to the second intermediate element, and the first output element for example is able to be driven by the second intermediate element. The second intermediate element and the first output element can for example be able to be coupled by a gear set. To this end, the first output element can be drivable by way of or by the gear set. The gear set can comprise two permanently meshing output gears, a first output gear and a second output gear, which can be configured as fixed gears. The first output gear can be connected in a rotationally fixed manner to the second intermediate element, and the second output gear can be connected in a rotationally fixed manner to the first output element. The second output element can be connected, or able to be connected, to an output clutch, for example be connected or able to be connected in a releasable, rotationally fixed and/or drivable manner. The output clutch can be connected in a rotationally fixed manner to a third output gear. The third output gear can constantly mesh with the second output gear. The second output element can be drivably connected, or able to be drivably connected, to the first output element, and the second output element for example be able to be driven by the first output element. As a result, a modular and/or compact construction mode of the transmission can be achieved because the individual units of the transmission, thus the primary transmission unit and/or the reversing unit and/or the intermediate gearbox, can be replaceable.

Overall, in each embodiment at least, or exactly, fourteen forward gears can be established by the primary transmission unit, and in each embodiment at least, for example exactly, two forward gears can be established by the intermediate gearbox, and at least, or exactly, one forward gear and one reverse gear can in each case be established by the reversing unit.

The disclosure furthermore relates to an agricultural or industrial commercial vehicle, for example a tractor or hauler, or a construction machine. The agricultural or industrial commercial vehicle comprises a transmission, for example a transmission as disclosed in one of the embodiments herein. The commercial vehicle can moreover comprise a traction motor. The transmission is configured for transmitting a torque generated by a traction motor to at least one front and/or rear driven axle of an agricultural or industrial commercial vehicle. The commercial vehicle according to the disclosure has the above-described advantages of the transmission according to the disclosure.

In an embodiment of the disclosure, the transmission is disposed in the commercial vehicle in such a manner that the transmission longitudinal axis is substantially parallel to or coaxial with, for example is parallel to or coaxial with, a vehicle longitudinal axis. The primary transmission unit, and/or for example the reversing unit and/or the intermediate gearbox, here can be aligned along the transmission longitudinal axis. However, the transmission may also be disposed in the commercial vehicle in such a manner that a transmission central plane is substantially parallel to or congruent with the vehicle central plane, for example that the transmission central plane is parallel to or congruent with the vehicle central plane. In the commercial vehicle having a traction motor and the transmission, a torque generated by the traction motor can be able to be transmitted by the transmission to at least one front and/or rear driven axle of the commercial vehicle. The agricultural or industrial commercial vehicle can comprise a cab and a chassis, wherein the cab can be disposed on, for example on top of, the chassis. The axial position of the drive element of the transmission can be determined by the position of the crankshaft of the traction motor. The first output element can be longitudinally oriented and be in the same vertical position as the rear driven axle, the axis of the latter potentially being coaxial with the rear wheels. Likewise, the second output element, for example a second output shaft, can be longitudinally oriented and be in the same vertical position as the front driven axle, the axis of the latter potentially being coaxial with the front ground engagement means or wheels. The front and the rear driven axle can be drivable by the first output element. However, the rear driven axle can also be drivable by the first output element, and the front driven axle by the second output element. The commercial vehicle according to the disclosure has a significantly more slender and/or compact construction mode, and/or the transmission requires less installation space.

At least twenty-eight forward gears, and for example at least twenty-eight reverse gears, between the drive element and the first output element and/or the second output element can be able to be established and/or implemented by the transmission according to the disclosure and the commercial vehicle according to the disclosure that comprises the transmission. The transmission according to the disclosure and/or the commercial vehicle according to the disclosure have at least one and/or a plurality of the following advantages:

Higher efficiency and less output lost by the transmission.
The transmission requires less volume in terms of the package thereof, thus a smaller installation space than known comparable transmissions.
More options in terms of the transmission ratio of the transmission by virtue of the combination of a plurality of planetary stages.
Lower noise level.
Fewer clutches.
Compact installation space, and for example a reduction in the volume of the transmission and/or of the required installation space in the commercial vehicle.
Coaxial disposal of the drive element and the first and/or second output element.
The transmission has a lower weight and lower production costs than known comparable transmissions.
Higher output density and a higher capacity in terms of torque.
Longer service life of the transmission in comparison to known comparable transmissions, by virtue of the use of planetary gear sets.
Low moment of inertia.

The disclosure as well as further advantages and advantageous refinements and embodiments of the disclosure, in terms of the hardware as well as the method, will be explained in more detail hereunder by means of exemplary embodiments and with reference to the drawings.

BRIEF DESCRIPTION OF THE DRAWINGS

Functionally equivalent or comparable components here are provided with the same reference signs. In the drawings:

FIG. 3 shows a schematic illustration of a gear shift diagram of the first exemplary embodiment of the transmission according to the disclosure.

DETAILED DESCRIPTION

The embodiments or implementations disclosed in the above drawings and the following detailed description are not intended to be exhaustive or to limit the present disclosure to these embodiments or implementations.

Figure 1:
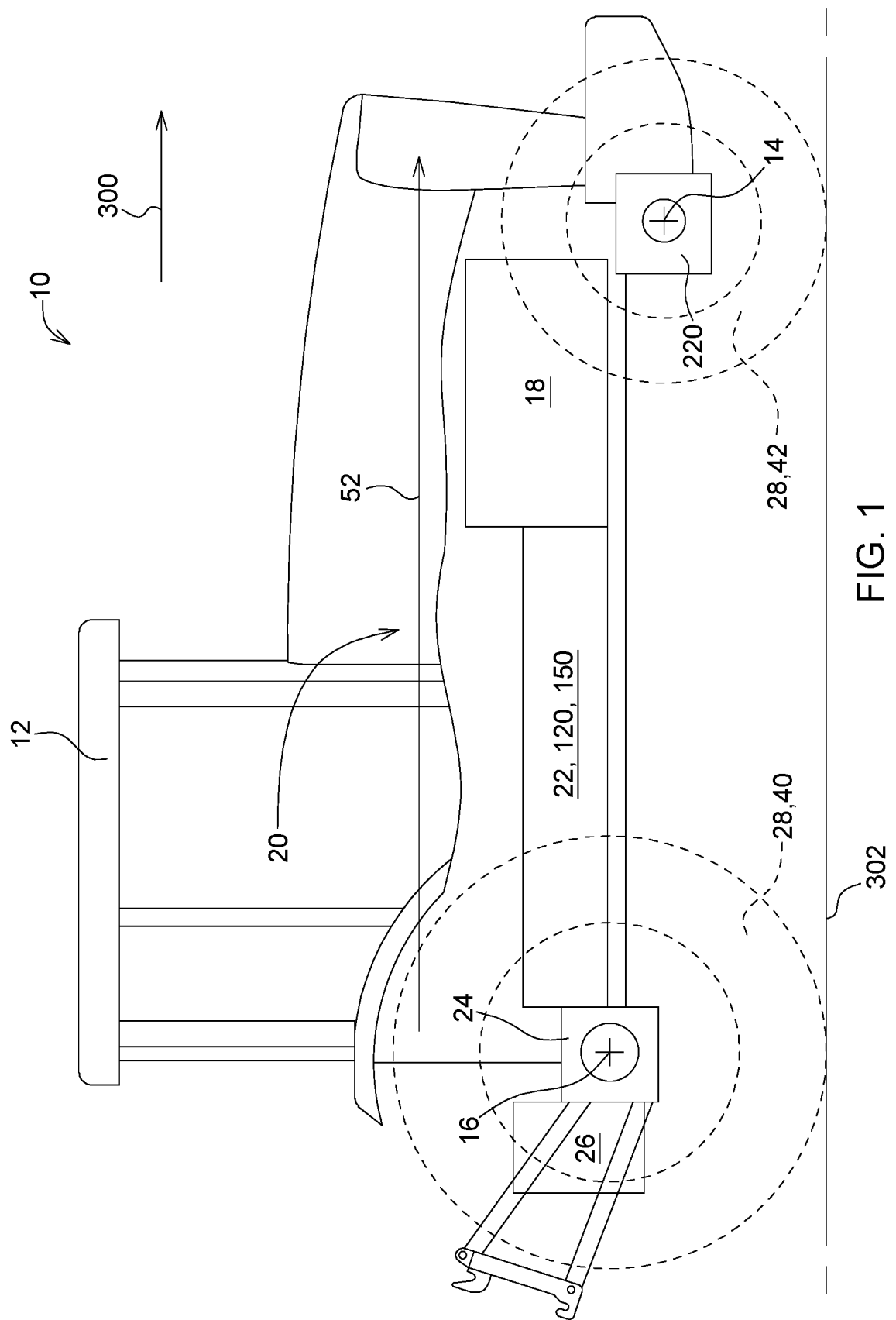
FIG. 1 shows a schematic illustration of a first exemplary embodiment of an agricultural or industrial commercial vehicle according to the disclosure, having a transmission according to the disclosure.

FIG. 1 shows a schematic illustration of a first exemplary embodiment of an agricultural or industrial commercial vehicle 10 according to the disclosure, for example of a tractor or hauler, having a transmission 20 according to the disclosure. The fundamental construction of a commercial vehicle 10 is assumed to be known to the person skilled in the art. The commercial vehicle 10 comprises a cab 12, a front driven axle 14, and a rear driven axle 16. The rear driven axle 16 can be permanently driven, and the front driven axle 14 can be able to be activated on demand or be permanently driven. The commercial vehicle 10 furthermore comprises a traction motor 18 which can be embodied as an internal combustion engine. The transmission 20 has a power train architecture which may be assembled from various individual transmission modules, as described hereunder. The power train architecture described here, in the force flux and torque flux, proceeding from the traction motor 18, can have a transmission 20 according to the disclosure, having a primary transmission unit 22 and, for example, a rear axle module 24 and a power take-off module 26.

The transmission 20 here, for example the primary transmission unit 22, counter to the forward travel direction 300 of the commercial vehicle 10, is disposed downstream of the traction motor 18 and/or along a vehicle longitudinal axis 52, thus a longitudinal axis of the commercial vehicle 10. The transmission 20, for example the primary transmission unit 22, for driving is operatively connected to the traction motor 18, and/or can be drivable by the traction motor 18. The rear axle module 24 can be disposed downstream of the transmission 20, for example downstream of the primary transmission unit 22 or of a reversing unit 120, or of an intermediate gearbox 150. The rear axle module 24 here for driving can be operatively connected to, and/or can be drivable by, the primary transmission unit 22 or the reversing unit 120 or the intermediate gearbox 150. A force and a torque of the traction motor 18 can be transmitted by way of different gear stages to a first output element (see FIG. 2, reference sign 32) and/or a second output element (see FIG. 2, reference sign 190) by the transmission 20 shown.

The first output element 32 and/or the second output element 190 for driving can in turn be operatively connected to the rear and/or front driven axle 14, 16. Likewise, the first output element for driving can however also be operatively connected to the rear driven axle 16, and the second output element 190 for driving be operatively connected to the front driven axle 14. The front and/or rear driven axle 14, 16 can thus be drivable by the first output element 32; for example, a force and a torque from the first output element 32 can be transmitted to the front and/or rear driven axle 14, 16. However, the rear driven axle 16 can also be drivable by the first output element 32, and/or the front driven axle 14 be drivable by the second output element 190; for example, a force and a torque from the first output element 32 can be transmitted to the rear driven axle 16, and/or a force and a torque from the second output element 190 can be transmitted to the front driven axle 14. The front and/or rear driven axle 14, 16 convert a rotation of the first and/or second output element 32, 190 to a rotation of one or a plurality of ground engagement means 28, and thus to a propulsion of the commercial vehicle. Therefore, the commercial vehicle, as a function of a gear stage selected in the transmission 20, can be driven at a variable rotating speed. Consequently, a commercial vehicle 10 equipped with the transmission 20, as a function of the gear stage selected in the transmission 20, can be moved in different speed ranges.

The towing vehicle 10 can have one or a plurality of ground engagement means 28, here illustrated in the form of wheels 40, 42, which engage with a hard ground 302 so as to transmit traction forces, and/or by way of which the towing vehicle 10 is supported on the hard ground. The towing vehicle 10 can moreover have a chassis (not illustrated), wherein the chassis can for example be supported on the wheels 28 suspended on the front and the rear driven axle 14, 16.

Figure 2:
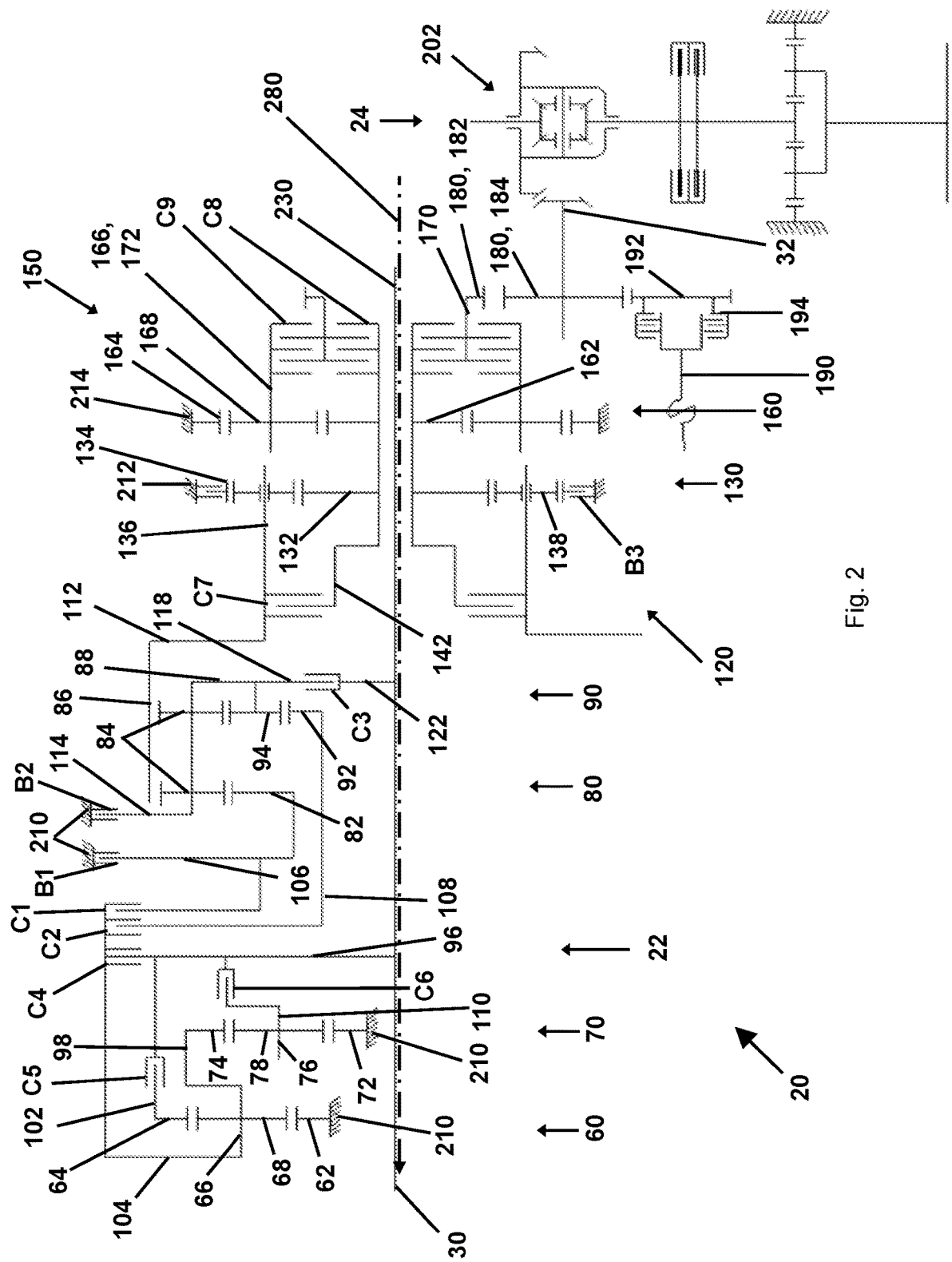
FIG. 2 shows a schematic illustration of a first exemplary embodiment of the transmission according to the disclosure.

FIG. 2 shows a schematic illustration of a first exemplary embodiment of the transmission 20 according to the disclosure. The transmission 20 shown in FIG. 2 corresponds substantially to the transmission shown in FIG. 1, which is why details not shown in FIG. 1 will be discussed hereunder. The commercial vehicle 10 according to FIG. 1 can comprise the transmission 20 as illustrated in FIG. 2. The transmission 20 for transmitting a torque generated by a traction motor 18 to at least one front and/or rear driven axle 14, 16 of the agricultural or industrial commercial vehicle 10 comprises a drive element 30 and the first output element 32 and a primary transmission unit 22. The primary transmission unit 22 comprises a first, a second, a third and a fourth planetary gear set 70, 80, 90, 60. The first planetary gear set 70 has a first sun gear 72, a first ring gear 74, a first planet carrier 76, and a first planet set 78. The fourth planetary gear set 60 has a fourth sun gear 62, a fourth ring gear 64, a fourth planet carrier 66, and a fourth planet set 68. The second planetary gear set 80 has a second sun gear 82. The third planetary gear set 90 has a third sun gear 92 and a third planet set 94. Moreover, the second and the third planetary gear set 80, 90 have a first common planet set 84 and a first common ring gear 86 and a first common planet carrier 88. The primary transmission unit 22 comprises at least eight shifting elements C1, C2, C3, C4, C5, C6, B1, B2. The transmission 20 furthermore comprises an intermediate gearbox 150 having at least two shifting elements C8, C9, and a reversing unit 120 having at least two shifting elements B3, C7. At least three shifting elements C1, C2, C3, C4, C5, C6, B1, B2 of the primary transmission unit 22, and at least one shifting element C8, C9 of the intermediate gearbox 150, and at least one shifting element B3, C7 of the reversing unit 120 are activatable in combinations of at least four shifting elements C1, C2, C3, C4, C5, C6, C7, C8, C9, B1, B2, B3 so as to establish at least 28 (twenty-eight) forward gears between the drive element 30 and the first output element 32. The shifting elements of the primary transmission unit 22 are a first brake B1 and a second brake B2 and a first clutch C1 and a second clutch C2 and a third clutch C3 and a fourth clutch C4 and a fifth clutch C5 and a sixth clutch C6. The drive element 30 is connected, or able to be connected, to the fourth clutch C4 and the fifth clutch C5 and the sixth clutch C6, for example connected or able to be connected in a rotationally fixed and/or drivable manner. The transmission 20, for example the primary transmission unit 22, can comprise a first connecting element 96, for example a first connecting shaft. The first connecting element 96 can be connected, or able to be connected, to the drive element 30 and the fourth clutch C4 and the fifth clutch C5 and the sixth clutch C6, for example be connected or able to be connected in a rotationally fixed and/or drivable manner. The fifth clutch C5 is connected, or able to be connected, to the fourth ring gear 64, for example connected or able to be connected in a rotationally fixed and/or drivable manner. The transmission 20, for example the primary transmission unit 22, can comprise a second connecting element 102, for example a second connecting shaft. The second connecting element 102 can be connected, or able to be connected, to the fifth clutch C5 and the fourth ring gear 64, for example be connected or able to be connected in a rotationally fixed and/or drivable manner. The drive element 30, and for example the first connecting element 96, is, or is able to be, releasably connected by the fifth clutch C5, or by way of the fifth clutch C5, to the fourth ring gear 64 and/or for example the second connecting element 102, for example is, or is able to be, connected in a releasable, rotationally fixed and/or drivable manner. The sixth clutch C6 is connected, or able to be connected, to the first planet carrier 76, for example connected or able to be connected in a rotationally fixed and/or drivable manner. The transmission 20, for example the primary transmission unit 22, can comprise a third connecting element 110, for example a third connecting shaft. The third connecting element 110 can be connected, or able to be connected, to the sixth clutch C6 and the first planet carrier 76, for example be connected or able to be connected in a rotationally fixed and/or drivable manner. The drive element 30, and for example the first connecting element 96, is, or is able to be, releasably connected by the sixth clutch C6, or by way of the sixth clutch C6, to the first planet carrier 76 and/or for example the third connecting element 110, for example is, or is able to be, connected in a releasable, rotationally fixed and/or drivable manner. The first ring gear 74 is connected to the fourth planet carrier 66, for example connected in a rotationally fixed and/or drivable manner. The transmission 20, for example the primary transmission unit 22, can comprise a fourth connecting element 98, for example a fourth connecting shaft. The fourth connecting element 98 can be connected to the first ring gear 74 and the fourth planet carrier 66, for example be connected in a rotationally fixed and/or drivable manner. The fourth planet carrier 66 is connected, or able to be connected, to the first clutch C1 and/or the second clutch C2 and/or the fourth clutch C4, for example connected or able to be connected in a rotationally fixed and/or drivable manner. Likewise, the transmission 20, for example the primary transmission unit 22, can comprise a fifth connecting element 104, for example a fifth connecting shaft. The fifth connecting element 104 can be connected, or able to be connected, to the fourth planet carrier 66 and/or the first clutch C1 and/or the second clutch C2 and/or the fourth clutch C4, for example be connected or able to be connected in a rotationally fixed and/or drivable manner. The fourth planet carrier 66, and for example the fifth connecting element 104, is releasably connected, or able to be releasably connected, by the fourth clutch C4, or by way of the fourth clutch C4, to the drive element 30 and for example the first connecting element 96, for example connected or able to be connected in a releasable, rotationally fixed and/or drivable manner. Moreover, the second sun gear 82 is connected, or able to be connected, to the first brake B1 and/or the first clutch C1, for example connected or able to be connected in a rotationally fixed and/or drivable manner. The transmission 20, for example the primary transmission unit 22, can comprise a sixth connecting element 106, for example a sixth connecting shaft. The sixth connecting element 106 can be connected, or able to be connected, to the second sun gear 82 and/or the first brake B1 and/or the first clutch C1, for example be connected or able to be connected in a rotationally fixed and/or drivable manner. The first clutch C1 and/or the second clutch C2 and/or the third clutch C3, and for example the fifth connecting element 104, is, or is able to be, releasably connected by the first clutch C1, or by way of the first clutch C1, to the second sun gear 82 and/or the first brake B1 and/or for example the sixth connecting element 106, for example is, or is able to be, connected in a releasable, rotationally fixed and/or drivable manner. The second sun gear 82, and for example the sixth connecting element 106, by way of the first brake B1 is able to be held against rotating, for example able to be releasably held against rotating. The second sun gear 82, and for example the sixth connecting element 106, by way of the first brake B1 can be able to be coupled to a primary transmission housing 210 and/or able to be releasably connected to the primary transmission housing 210, for example be able to be releasably held against rotating. Likewise, the third sun gear 92 is connected, or able to be connected, to the second clutch C2, for example connected or able to be connected in a rotationally fixed and/or drivable manner. The transmission 20, for example the primary transmission unit 22, can comprise a seventh connecting element 108, for example a seventh connecting shaft. The seventh connecting element 108 can be connected, or able to be connected, to the third sun gear 92 and/or the second clutch C2, for example be connected or able to be connected in a rotationally fixed and/or drivable manner. The first clutch C1 and/or the second clutch C2 and/or the fourth clutch C4, and for example the fifth connecting element 104, is releasably connected, or is able to be releasably connected, by the second clutch C2, or by way of the second clutch C2, to the third sun gear 92 and/or for example the seventh connecting element 108, for example is, or is able to be, connected in a releasable, rotationally fixed and/or drivable manner. The first sun gear 72 and the fourth sun gear 62 can be held against rotating. The first sun gear 72 and the fourth sun gear 62 can be coupled to the primary transmission housing 210 and/or be able to be connected to the primary transmission housing 210, for example be held against rotating. Likewise, the first common planet carrier 88 and the first common planet set 84 are connected, or able to be connected, to the second brake B2, for example connected or able to be connected in a rotationally fixed and/or drivable manner. The transmission 20, for example the primary transmission unit 22, can comprise an eighth connecting element 114, for example an eighth connecting shaft. The eighth connecting element 114 can be connected, or able to be connected, to the second brake B2 and/or the first common planet carrier 88, for example be connected or able to be connected in a rotationally fixed and/or drivable manner. Specifically, the transmission 20, for example the primary transmission unit 22, can comprise a first intermediate element 112. The first intermediate element 112 can be connected to the first common ring gear 86, for example be connected in a rotationally fixed and/or drivable manner. The first common planet carrier 88 and/or the first common planet set 84, and for example the eighth connecting element 114, by way of the second brake B2 are able to be held against rotating, for example able to be releasably held against rotating. The first common planet carrier 88 and/or the first common planet set 84, and for example the eighth connecting element 114, by way of the second brake B2 can be able to be coupled to the primary transmission housing 210 and/or able to be releasably connected to the primary transmission housing 210, for example be able to be releasably held against rotating. The drive element 30 is connected to the third clutch C3, for example connected in a rotationally fixed and/or drivable manner. The transmission 20, for example the primary transmission unit 22, can comprise a ninth connecting element 122, for example a ninth connecting shaft. The ninth connecting element 122 can be connected to the drive element 30 and the third clutch C3, for example be connected in a rotationally fixed and/or drivable manner. The third clutch C3 is able to be connected to the first common planet carrier 88, for example able to be connected in a rotationally fixed and/or drivable manner. The transmission 20, for example the primary transmission unit 22, can comprise a tenth connecting element 118, for example a tenth connecting shaft. The tenth connecting element 118 can be connected, or able to be connected, to the first common planet carrier 88 and the third clutch, for example be connected or able to be connected in a rotationally fixed and/or drivable manner. The drive element 30, and for example the ninth connecting element 122, is releasably connected, or able to be releasably connected, by the third clutch C3, or by way of the third clutch C3, to the first common planet carrier 88 and/or for example the tenth connecting element 118, for example connected or able to be connected in a releasable, rotationally fixed and/or drivable manner. As a result, an optimal compact packaging density of the transmission 20, for example of the primary transmission unit 22, can be achieved, for example also a compact spatial disposal of the transmission 20 in the commercial vehicle in a state installed in the commercial vehicle 10.

The transmission 20 furthermore comprises a reversing unit 120. The reversing unit 120 comprises a fifth planetary gear set 130 having a fifth sun gear 132, a fifth ring gear 134, a fifth planet carrier 136, and a fifth planet set 138. The reversing unit 120 comprises two shifting elements B3, C7 which are activatable, for example selectively activatable, such as lockable and releasable, and/or throwable and/or shiftable and/or selectively engageable, such that the first common ring gear 86, and for example the first intermediate element 112, are able to be connected to the fourth sun gear 132, or that the fourth ring gear 134 is able to be held against rotating. The shifting elements of the reversing unit 120 are a seventh clutch C7 and a third brake B3. The first common ring gear 86, and for example the first intermediate element 112, is connected, or able to be connected, to the fifth planet carrier 136 and the seventh clutch C7, for example connected or able to be connected in a rotationally fixed and/or drivable manner. The fifth sun gear 132 can be connected, or able to be connected, to a sixth sun gear 162 and/or the seventh clutch C7 and/or an eighth clutch C8, for example be connected or able to be connected in a rotationally fixed and/or drivable manner. The reversing unit 120 can comprise an eleventh connecting element 142, for example an eleventh connecting shaft. The eleventh connecting element 142 can be connected, or able to be connected, to the fifth sun gear 132 and a sixth sun gear 162 and/or the seventh clutch C7 and/or the eighth clutch C8, for example be connected or able to be connected in a rotationally fixed and/or drivable manner. The fifth planet carrier 136 and the first common ring gear 86, and for example the first intermediate element 112, are able to be releasably connected by the seventh clutch C7, or by way of the seventh clutch C7, to the fifth sun gear 132 and/or for example the eleventh connecting element 142, for example able to be connected in a releasable, rotationally fixed manner. The fifth ring gear 134 by way of the third brake B3 is able to be releasably held against rotating. The fifth ring gear 134 by way of the third brake B3 can be able to be coupled to the reversing unit housing 212, and/or be able to be releasably connected to the latter.

The transmission 20 furthermore comprises an intermediate gearbox 150. The intermediate gearbox 150 has a sixth planetary gear set 160 having a sixth sun gear 162, a sixth ring gear 164, a sixth planet carrier 166, and a sixth planet set 168. The two shifting elements C8, C9 of the intermediate gearbox 150 are the eighth clutch C8 and a ninth clutch C9. The shifting elements C8, C9 of the intermediate gearbox 150 are activatable, for example selectively activatable, such as lockable and releasable and/or throwable and/or shiftable and/or selectively engageable, so as to connect the sixth sun gear 162 or the sixth planet carrier 166 and/or the sixth planet set 168 to a second intermediate element 170 and/or the first output element 32. The sixth sun gear 162 is connected, or able to be connected, to the fifth sun gear 132 and/or the seventh clutch C7 and/or the eighth clutch C8, for example connected or able to be connected in a rotationally fixed and/or drivable manner. The eleventh connecting element 142 is connected, or able to be connected, to the fifth sun gear 132 and the sixth sun gear 162 and/or the seventh clutch C7 and/or the eighth clutch C8, for example connected or able to be connected in a rotationally fixed and/or drivable manner. Moreover, the sixth planet carrier 166 is connected, or able to be connected, to the ninth clutch C9, for example connected or able to be connected in a rotationally fixed and/or drivable manner. The transmission 20, for example the intermediate gearbox 150, can comprise a twelfth connecting element 172, for example a twelfth connecting shaft. The twelfth connecting element 172 can be connected, or able to be connected, to the ninth clutch C9 and/or the sixth planet carrier 166, for example be connected or able to be connected in a rotationally fixed and/or drivable manner. The sixth sun gear 162 and the fifth sun gear 132, and for example the eleventh connecting element 142, are able to be releasably connected by the eighth clutch C8, or by way of the eighth clutch C8, to the second intermediate element 170 and/or for example the first output element 32, for example to be connected in a releasable, rotationally fixed and/or drivable manner. The sixth planet carrier 166, and for example the twelfth connecting element 172, is able to be releasably connected by the ninth clutch C9, or by way of the ninth clutch C9, to the second intermediate element 170 and/or for example the first output element 32, for example to be connected in a releasable, rotationally fixed manner. The sixth ring gear 164 is held against rotating. The sixth ring gear 164 can be coupled to the intermediate gearbox housing 214 and/or by way of the intermediate gearbox housing 214 be held against rotating. The first output element 32 is connected and/or able to be coupled to and/or drivable by the second intermediate element 170. To this end, the second intermediate element 170 and the first output element 32 can be coupled to a gear set 180, and/or the first output element 32 can be drivable by the second intermediate element 170. The gear set 180 comprises two permanently meshing output gears 182, 184, for example a first output gear 182 and a second output gear 184, which are configured as fixed gears. The first output gear 182 is connected in a rotationally fixed manner to the second intermediate element 170, and the second output gear 184 is connected in a rotationally fixed manner to the first output element 32. The second output element 190 is connected, or able to be connected, to an output clutch 194, for example connected or able to be connected in a releasable, rotationally fixed and/or drivable manner. The output clutch 194 is connected in a rotationally fixed manner to a third output gear 192. The third output gear 192 permanently meshes with the second output gear 184 such that the second output element 190 is drivable by the first output element 32.

The transmission 20 can moreover comprise a primary transmission housing 210 which receives the primary transmission unit 22, and/or a reversing unit housing 212 which receives the reversing unit 120, and/or an intermediate gearbox housing 214 which receives the intermediate gearbox 150, and/or a rear axle housing 216 which receives a rear axle module 24. The primary transmission housing 210 can at least partially or completely receive the drive element 30 and the first, the second, the third and the fourth planetary gear set 70, 80, 90, 60. The reversing unit housing 212 can be disposed on, for example directly on, the primary transmission housing 210, and/or the intermediate gearbox housing 214 can be disposed on, for example directly on, the reversing unit housing 212. A force flux and/or torque flux by way of the reversing unit 120 can be able to be established between the primary transmission unit 22 and the intermediate gearbox 150 and then the rear axle module 24. The reversing unit 120 in the direction of the force flux and/or torque flux can thus be disposed downstream of the primary transmission unit 22. Likewise, the intermediate gearbox 150 in the direction of the force flux and/or torque flux can be disposed downstream of the reversing unit 120. Moreover, the rear axle module 24 in the direction of the force flux and/or torque flux can be disposed downstream of the intermediate gearbox 150. The primary transmission housing 210 can also at least partially or completely receive the second output element 190. The primary transmission housing 210 and/or the reversing unit housing 212 and/or the intermediate gearbox housing 214 can specifically also be configured as one housing, thus a transmission housing, having individual portions in the transmission housing. The transmission or the planetary gear sets of the primary transmission unit and of the intermediate gearbox and of the reversing unit are aligned, for example aligned axially, along a transmission longitudinal axis 280.

The rear axle module 24 can comprise a rear axle differential 202 and/or the rear driven axle 16. Moreover, the rear axle module 24, for example the rear axle differential 202, can comprise a rear axle pinion and a rear axle gear wheel. The rear axle differential 202 can comprise a rear axle pinion, for example a drive bevel gear, or a bevel pinion, and a rear axle gear wheel, for example a bevel gear wheel or a ring gear wheel. The transmission 20 can additionally comprise a front axle module 220 (see FIG. 1) having a front axle differential (not illustrated) and/or the front driven axle 14. The front axle housing (not illustrated) can receive the front axle module 220, for example the front axle differential (not illustrated), and/or at least partially receive the front driven axle 14. The front axle differential (not illustrated) can comprise a front axle pinion (not illustrated), for example a drive bevel gear, or a bevel pinion, and a front axle gear wheel, for example a bevel gear wheel or a ring gear wheel. The second output element 190 can be connected to the front axle pinion, or the front axle pinion and the second output element 190 can be configured as an integral component. The transmission 20 can also comprise the power take-off module 26, and/or the rear axle module 24 can be disposed between the power take-off module 26 and the intermediate gearbox 150. The transmission 20 can moreover comprise a power take-off drive shaft 230. The power take-off drive shaft 230 can either be connected directly to the traction motor 20, for example the crankshaft, or be connected by way of a further coupling element or a toothed or screwed connection, for example, or by means of a further drive shaft (not illustrated). As a result, the power take-off drive shaft 230 can be drivable by the crankshaft, and a force and/or a torque can be able to be transmitted from the crankshaft to the power take-off drive shaft 230. The power take-off drive shaft 230 can be partially or completely disposed in the drive element 30. The power take-off drive shaft 230 can be at least partially disposed in the primary transmission unit 22, for example the primary transmission housing 210, and/or the reversing unit 120, for example the reversing unit housing 212, and/or the intermediate gearbox 150, for example the intermediate gearbox housing 214, and/or the rear axle module 24, for example the rear axle housing 216, and/or the power take-off module 26, for example a power take-off housing. The power take-off module 26 can likewise comprise a power take-off stub (not illustrated). The power take-off housing can at least partially receive the power take-off drive shaft 230 and/or at least partially receive the power take-off stub. At least two, for example exactly two or three, shifting elements B1, B2, C1, C2, C3, C4, C5, C6 of the primary transmission unit 22, and at least one, for example exactly one, shifting element C8, C9 of the intermediate gearbox 150, and at least one, for example exactly one, shifting element B3, C7 of the reversing unit 120 are thus activatable, for example selectively activatable, such as lockable and releasable, and/or throwable and/or shiftable and/or selectively engageable in combinations of at least four shifting elements, for example exactly four or five shifting elements B1, B2, B3, C1, C2, C3, C4, C5, C6, C7, C8, C9, so as to establish at least twenty-eight forward gears, for example exactly twenty-eight forward gears, and for example at least or exactly twenty-eight reverse gears, between the drive element 30 and the first output element 32 and/or the second output element 190. In some embodiments, fewer than twenty-eight reverse gears, may also be actually used.

FIG. 3 shows a schematic illustration of a gear shift diagram of the first exemplary embodiment. The gear shift diagram shows the twenty-eight forward gears. The twenty-eight reverse gears result when the seventh clutch C7 is activated, for example released, and the third brake B3 is activated, for example closed. According to the gear shift diagram, the first forward gear results by activating, for example closing, the second brake B2 and the second clutch C2 and the fifth clutch C5 and the seventh clutch C7 and the ninth clutch C9. The second forward gear results by activating, for example closing, the second brake B2 and the second clutch C2 and the fourth clutch C4 and the seventh clutch C7 and the ninth clutch C9. The third forward gear results by activating, for example closing, the first brake B1 and the second clutch C2 and the fifth clutch C5 and the seventh clutch C7 and the ninth clutch C9. The fourth forward gear results by activating, for example closing, the second brake B2 and the second clutch C2 and the sixth clutch C6 and the seventh clutch C7 and the ninth clutch C9. The fifth forward gear results by activating, for example closing, the first brake B1 and the second clutch C2 and the fourth clutch C4 and the seventh clutch C7 and the ninth clutch C9. The sixth forward gear results by activating, for example closing, the first clutch C1 and the second clutch C2 and the fifth clutch C5 and the seventh clutch C7 and the ninth clutch C9. The seventh forward gear results by activating, for example closing, the first brake and the second clutch C2 and the sixth clutch C6 and the seventh clutch C7 and the ninth clutch C9. The eighth forward gear results by activating, for example closing, the first clutch C1 and the third clutch C3 and the sixth clutch C6 and the seventh clutch C7 and the ninth clutch C9. The ninth forward gear results by activating, for example closing, the second clutch C2 and the third clutch C3 and the fifth clutch C5 and the seventh clutch C7 and the ninth clutch C9. The tenth forward gear results by activating, for example closing, the second brake and the second clutch C2 and the fifth clutch C5 and the seventh clutch C7 and the eighth clutch C8. The eleventh forward gear results by activating, for example closing, the first clutch C1 and the second clutch C2 and the fourth clutch C4 and the seventh clutch C7 and the ninth clutch C9. The twelfth forward gear results by activating, for example closing, the second clutch C2 and the third clutch C3 and the sixth clutch C6 and the seventh clutch C7 and the ninth clutch C9. The thirteenth forward gear results by activating, for example closing, the first clutch C1 and the third clutch C3 and the fifth clutch C5 and the seventh clutch C7 and the ninth clutch C9. The fourteenth forward gear results by activating, for example closing, the second brake B2 and the second clutch C2 and the fourth clutch C4 and the seventh clutch C7 and the eighth clutch C8. The fifteenth forward gear results by activating, for example closing, the first clutch C1 and the second clutch C2 and the sixth clutch C6 and the seventh clutch C7 and the ninth clutch C9. The sixteenth forward gear results by activating, for example closing, the first brake B1 and the second clutch C2 and the fifth clutch C5 and the seventh clutch C7 and the eighth clutch C8. The seventeenth forward gear results by activating, for example closing, the first brake B1 and the third clutch C3 and the sixth clutch C6 and the seventh clutch C7 and the ninth clutch C9. The eighteenth forward gear results by activating, for example closing, the second brake B2 and the second clutch C2 and the sixth clutch C6 and the seventh clutch C7 and the eighth clutch C8. The nineteenth forward gear results by activating, for example closing, the first brake B1 and the second clutch C2 and the fourth clutch C4 and the seventh clutch C7 and the eighth clutch C8. The twentieth forward gear results by activating, for example closing, the first clutch C1 and the second clutch C2 and the fifth clutch C5 and the seventh clutch C7 and the eighth clutch C8. The twenty-first forward gear results by activating, for example closing, the first brake and the second clutch C2 and the sixth clutch C6 and the seventh clutch C7 and the eighth clutch C8. The twenty-second forward gear results by activating, for example closing, the first clutch C1 and the third clutch C3 and the sixth clutch C6 and the seventh clutch C7 and the eighth clutch C8. The twenty-third forward gear results by activating, for example closing, the second clutch C2 and the third clutch C3 and the fifth clutch C5 and the seventh clutch C7 and the eighth clutch C8. The twenty-fourth forward gear results by activating, for example closing, the first clutch C1 and the second clutch C2 and the fourth clutch C4 and the seventh clutch C7 and the eighth clutch C8. The twenty-fifth forward gear results by activating, for example closing, the second clutch C2 and the third clutch C3 and the sixth clutch C6 and the seventh clutch C7 and the eighth clutch C8. The twenty-sixth forward gear results by activating, for example closing, the first clutch C1 and the third clutch C3 and the fifth clutch C5 and the seventh clutch C7 and the eighth clutch C8. The twenty-seventh forward gear results by activating, for example closing, the first clutch C1 and the second clutch C2 and the sixth clutch C6 and the seventh clutch C7 and the eighth clutch C8. The twenty-eighth forward gear results by activating, for example closing, the first brake B1 and the third clutch C3 and the sixth clutch C6 and the seventh clutch C7 and the eighth clutch C8.

The advantages mentioned hereunder apply to all figures shown. A configuration of the transmission 20 and of the commercial vehicle 10 that is simple in terms of construction, for example also with a view to a lightweight construction mode of the transmission 20 and of the commercial vehicle 10, is achieved by the transmission 20 according to the disclosure, for example because a minimum number of gear wheels, clutches and brakes are required for the transmission 20. By virtue of the high packaging density of the transmission components of the transmission 20 in the axial direction and the lateral direction, the transmission 20 has a compact construction mode with a minimum installation space. An additional installation space for components outside the transmission 20 is likewise made possible. At the same time, an optimum number of gears can be achieved. Moreover, the material costs for the transmission 20 can be reduced by virtue of the optimized construction mode.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may be comprised of any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A transmission for transmitting a torque generated by a traction motor to at least one driven axle of an agricultural or industrial commercial vehicle, the transmission comprising:

a drive element;
a first output element;
a primary transmission unit including a first planetary gear set having a first sun gear, a first ring gear, a first planet carrier, and a first planet set, and a second planetary gear set having a second sun gear, and a third planetary gear set having a third sun gear and a third planet set, and a fourth planetary gear set having a fourth sun gear, a fourth ring gear, a fourth planet carrier, and a fourth planet set (68), and wherein the second planetary gear set and the third planetary gear set have a first common planet set, a first common ring gear, a first common planet carrier, and the primary transmission unit includes at least eight shifting elements;
a reversing unit including at least two shifting elements; and
an intermediate gearbox including at least two shifting elements;
wherein at least three of the at least eight shifting elements of the primary transmission unit, at least one of the at least two shifting elements of the reversing unit, and at least one of the at least two shifting elements of the intermediate gearbox are activatable in combinations of at least five shifting elements so as to establish at least twenty-eight forward gears between the drive element and the first output element.

2. The transmission of claim 1, wherein the intermediate gearbox is disposed in a direction of a force flux and torque flux downstream of the primary transmission unit and upstream of the reversing unit.

3. The transmission of claim 1, wherein the reversing unit is disposed in a direction of a force flux and torque flux downstream of the primary transmission unit and upstream of the intermediate gearbox.

4. The transmission of claim 1, wherein the at least eight shifting elements of the primary transmission unit include a first brake, a second brake, a first clutch, a second clutch, a third clutch, a fourth clutch, a fifth clutch, and a sixth clutch.

5. The transmission of claim 1, wherein the reversing unit includes a fifth planetary gear set having a fifth sun gear, a fifth ring gear, a fifth planet carrier, and a fifth planet set.

6. The transmission of claim 1, wherein the intermediate gearbox includes a sixth planetary gear set having a sixth sun gear, a sixth ring gear, a sixth planet carrier, and a sixth planet set.

7. The transmission of claim 1, wherein the at least two shifting elements of the reversing unit include a seventh clutch and a third brake.

8. The transmission of claim 1, wherein the at least two shifting elements of the intermediate gearbox include an eighth clutch and a ninth clutch.

9. The transmission of claim 1, further comprising a power take-off module.

10. The transmission of claim 9, further comprising a rear axle module disposed between the power take-off module and the primary transmission unit.

11. The transmission of claim 9, further comprising a power take-off drive shaft.

12. The transmission of claim 1, wherein the first output element is connected in a drivable manner to a second intermediate element.

13. An agricultural or commercial vehicle comprising the transmission of claim 1.

14. The agricultural or commercial vehicle of claim 13, wherein the transmission is disposed in the vehicle in such a manner that a transmission longitudinal axis is substantially parallel to a vehicle longitudinal axis.

* * * * *